United States Patent

Shibata

[11] Patent Number: 5,589,986
[45] Date of Patent: Dec. 31, 1996

[54] ZOOM LENS

[75] Inventor: Hironori Shibata, Hachioji, Japan

[73] Assignee: Olympus Optical Co., Ltd., Tokyo, Japan

[21] Appl. No.: 437,477

[22] Filed: May 9, 1995

[30] Foreign Application Priority Data

May 18, 1994 [JP] Japan .................................. 6-103851

[51] Int. Cl.$^6$ ................... G02B 15/14; G02B 3/02
[52] U.S. Cl. ..................... 359/684; 359/685; 359/715; 359/740
[58] Field of Search ........................ 359/684, 714, 359/715, 740

[56] References Cited

U.S. PATENT DOCUMENTS

| | | | |
|---|---|---|---|
| 4,650,291 | 3/1987 | Kato | 359/684 |
| 4,702,567 | 10/1987 | Kato et al. | 359/684 |
| 5,009,492 | 4/1991 | Hamano | 359/684 |
| 5,241,421 | 8/1993 | Endo et al. | 359/684 |

FOREIGN PATENT DOCUMENTS

| | | | |
|---|---|---|---|
| 2650551 | 5/1977 | Germany | 359/685 |
| 135913 | 8/1982 | Japan | 359/685 |

Primary Examiner—Georgia Y. Epps
Assistant Examiner—Evelyn A. Lester
Attorney, Agent, or Firm—Kenyon & Kenyon

[57] ABSTRACT

A zoom lens comprising, in the order from the object side, a front lens group including a variator lens unit with a negative refractive power; an aperture stop; and a rear lens group arranged behind the aperture stop. The rear lens group includes a lens unit having a positive refractive power, a focusing lens unit having a negative refractive power, and a compensator lens unit having a positive refractive power. At the time of zooming, the lens unit having the positive refractive power moves together with the focusing lens unit, and at the time of focusing, only the focusing lens unit moves separately from the lens unit having the positive refractive power.

24 Claims, 2 Drawing Sheets

ZOOM LENS

BACKGROUND OF THE INVENTION

1. Field of the Invention

This invention relates to a zoom lens, and more particularly to a zoom lens for a video camera using a solid-state image pickup device.

2. Description of the Related Art

A conventional focusing method for a zoom lens is a so-called inner focusing method which has contributed to miniaturizing a zoom lens system and minimizing a focusing distance. For example, Japanese Laid-Open Patent Application Publication No. Sho 59-30515 discloses a method of moving a part of a zoom lens group only when the zoom lens is focused. Japanese Laid-Open Patent Application Publication No. Hei 2-48620 discloses a method of moving a zoom lens group which is arranged in the rear of the zoom lens system and serves as a compensator.

However, the above-mentioned types of zoom lenses encounter the following problems: (1) miniaturizing a zoom lens system has not been successful, and (2) the quality of an image at a short photographic range has not been improved.

SUMMARY OF THE INVENTION

An object of the present invention is to provide a compact zoom lens.

Another object of the present invention is to provide a zoom lens which has good performance especially at a short object distance.

A further object of the present invention is to provide a compact zoom lens in which the variation of aberrations is small.

According to the present invention, a zoom lens system comprises, in the order from the object side, a front lens group including a variator lens unit with a negative refractive power; an aperture stop; and a rear lens group arranged behind the aperture stop. The rear lens group includes a lens unit having a positive refractive power, a focusing lens unit having a negative refractive power, and a compensator lens unit having a positive refractive power for correcting the position of an image due to the variation of magnification of the zoom lens system. The distance between the lens unit having the positive refractive power and the focusing lens unit is constant during the variation of magnification and variable during focusing. The focusing lens unit satisfies the following condition:

$$0 < 1/\beta_{FT} < 1.0 \quad (1)$$

where $\beta_{FT}$ is the lateral magnification at a telephoto end when focused on an infinite object.

First, the miniaturization of the zoom lens system is considered. Especially in a zoom lens having a high zooming ratio, the amount of movement of the variator lens unit for mainly varying the magnification is large. Thus, when this lens unit is arranged in front of the aperture stop and the compensator lens unit for correcting the position of the image is also arranged in front of the aperture stop, then the height of the rays incident on the variator lens unit becomes high, which results in the enlargement of the lens units in front of the aperture stop, and it is not appropriate for miniaturization.

In order to solve this problem, it is proper to arrange the variator lens unit in front of the aperture stop and the compensator lens unit behind the aperture stop.

Further, when the refractive power of the front lens group is increased to shorten the total length of the lens system, the negative refractive power of the variator lens unit increases and the marginal rays incident on the aperture stop becomes to be substantially divergent.

Thus, the lens unit having the positive power is arranged immediately behind the aperture stop to focus the rays quickly so that the diameter of the lens units behind the aperture stop can be prevented from becoming large.

The arrangement is followed by the negative focusing lens unit and the positive compensator lens unit, and the focusing lens unit satisfies condition (1). These are the features of the present invention which are explained below.

First, by defining the lateral magnification of the focusing lens unit as satisfying condition (1), the marginal rays coming from the focusing lens unit becomes substantially afocal rays, and the variation especially of spherical aberration due to the movement of the following positive compensator lens unit can be reduced.

Further, since the focusing lens unit satisfying condition (1) is a magnifying system, the focusing lens unit moves toward the image plane in a short photographic range.

By arranging the compensator lens unit immediately behind the focusing lens unit, it is possible to partly share the space where the focusing lens unit is moved for focusing and the space where the compensator lens unit is moved. Thus, as a result of the above described space utilization, the rear lens group behind the aperture stop can be miniaturized. Furthermore, since the relative distance between the positive lens unit immediately behind the aperture stop and the focusing lens unit where the height of the axial rays is high is not changed at the time of zooming, the variation of aberrations, especially spherical aberration, coma, or axial chromatic aberration, can be reduced. Moreover, since it is sufficient to consider the aberration correction for the two lens units as a whole, the number of lenses in each unit can be reduced.

As in the above-mentioned Japanese Laid-Open Patent Application Publication No. Hei 2-48620, if the compensator lens unit is moved toward the object side at the time of focusing, axial chromatic aberration increases in the negative direction. As in the present invention, however, if the negative lens unit is moved toward the image plane at the time of zooming, the chromatic aberration in the positive direction caused in the focusing lens unit remains unchanged, but the height of rays incident on the compensator lens unit decreases. Thus, the increasing tendency of the axial chromatic aberration in the negative direction in the compensator lens unit is reduced to provide a focusing method in which a small variation of axial chromatic aberration can be achieved in zooming and focussing in total.

With respect to spherical aberration, the same is applied. When the number of lenses of each unit is reduced, positive and negative spherical aberrations tend to be caused in the negative and positive lens units, respectively, and thus the negative spherical aberration increasing at the telephoto end is canceled by the fact that the height of the rays incident on the compensator lens unit becomes low at the time of focusing, as in the present invention.

If the lateral magnification $\beta_{FT}$ exceeds 1.0, the upper limit of the above condition (1), the lateral magnification approaches to an equal magnification so that the negative refractive power is too weak to correct the negative axial chromatic and spherical aberrations. On the other hand, if the lateral magnification $\beta_{FT}$ is less than 0, the lower limit of the above condition (1), the negative refractive power is too strong to correct the positive axial chromatic and spherical aberrations, or the height of the rays incident on the compensator lens unit is increased, which is not preferable.

With the above structure, a compact zoom lens with small aberration variation can be formed. Additionally, it is preferable if the range of the lateral magnification $\beta_{FT}$ is defined as follows:

$$0<\beta_{FT}<0.7 \tag{2}$$

With this limited range, the rays coming from the focusing lens unit become more similar to afocal rays so that the variation of spherical aberration and axial chromatic aberration can be minimized to maintain good imaging characteristics.

Further, when the zoom lens according to the present invention satisfies the following conditions (3) and (4), the marginal rays incident on the compensator lens unit at the telephoto end become converging rays.

$$\beta_{CT}>0 \tag{3}$$

$$\beta_{VT}<-1 \tag{4}$$

where $\beta_{CT}$ is the lateral magnification of the compensator lens unit focused at an infinite object at the telephoto end and $\beta_{VT}$ is the lateral magnification of the variator lens unit focused at an infinite object at the telephoto end. Thus, even if the variator lens unit moves toward the image side beyond the position where its lateral magnification is −1, the height of the rays incident on the compensator lens unit is not high so that this lens unit is minimized, thereby reducing the total length of the zoom lens.

A conventional zoom lens having a high zooming ratio usually has the problem that negative axial chromatic aberration increases at the telephoto end. However, if the compensator lens unit near the telephoto end is moved toward the image plane, negative axial chromatic aberration in the compensator lens unit can be reduced if the marginal rays are converging rays.

Moreover, it is preferable to satisfy the following condition:

$$0.2<D_F/D_C<10 \tag{5}$$

where $D_F$ is the amount of movement of the focusing lens unit at the telephoto end from the position where an infinite object is focused to the position where an object at a minimum distance is focused, and $D_C$ is the amount of movement of the compensator lens unit on the optical axis in the whole zooming range.

This relates to the above condition (1) and define the ratio of the amount of movement of the focusing lens unit to that of the compensator lens unit. If the ratio $D_F/D_C$ exceeds 10, the upper limit of condition (5), the amount of movement of the compensator lens unit is smaller than that of the focusing lens unit. Thus, the reduction of the negative chromatic aberration at the telephoto end cannot be expected.

Further, if the total length is attempted to reduced, the refractive power of the focusing lens unit at the telephoto end is weak and its amount of movement is large, so that the minimum focusing distance cannot be short. On the other hand, if the ratio $D_F/D_C$ is less than 0.2, the lower limit of condition (5), negative aberration due to the movement of the compensator lens unit decreases too much so that positive aberration is caused, or the refractive power of the focusing lens is too strong and a large amount of aberration is caused there.

If condition (5) is modified as follows:

$$0.25<D_F/D_C<3.0 \tag{6}$$

then the ratio of the amount of movement of the focusing lens unit to that of the compensator lens unit becomes more optimal, the zoom lens is more compact, and the variation of axial chromatic aberration and spherical aberration is minimum.

Further, when the front lens group in front of the aperture stop comprises, in the order from the object side, a first lens unit having a positive refractive power, and a second lens unit as a variator lens unit having a negative refractive power, it is possible to obtain the front lens group which has a high zooming ratio and in which the first lens unit is compact, and thus a more preferred zoom lens.

If the zoom lens according to the present invention satisfies the following condition (7), the amount of variation of axial chromatic aberration and spherical aberration from the wide-angle end to the telephoto end becomes small.

$$1<d_T/d_W<5 \tag{7}$$

where $d_T$ and $d_W$ are the distances between the focusing lens unit and the compensator lens unit focused to an infinite object at the telephoto end and the wide-angle end, respectively.

If the above condition (7) is further limited to the following:

$$1<d_T/d_W<2.4 \tag{8}$$

then the distance between the focusing lens unit and the compensator lens unit at the telephoto end becomes small, which is preferable for miniaturization.

If the zoom lens according to the present invention satisfies the following condition (9), its focusing performance is more improved.

$$0.1<|f_F/f_T|<0.8 \tag{9}$$

where $f_F$ is the focal length of the focussing lens unit and $f_T$ is the focal length of the total system at the telephoto end.

The above condition (9) defines the ratio of the focal length of the focusing lens unit and that of the total system at the telephoto end. By limiting the ratio to the above range, it is possible to obtain a proper amount of movement or a proper focusing sensitivity at the telephoto end where the focusing sensitivity is severe. That is, if the ratio exceeds 0.8, the upper limit, the focus stroke becomes too long, which is against miniaturization. On the other hand, if the ratio is less than 0.1, the lower limit, the focusing sensitivity becomes too severe so that mechanical control is difficult and focusing performance is likely to deteriorate.

When the focusing lens unit of the zoom lens according to the present invention comprises at least one negative lens and at least one positive lens in order to improve focusing performance, the variation of chromatic aberration in this lens unit can be reduced. Further, when the front lens group arranged in front of the aperture stop for mainly varying the magnification comprises a first lens unit having a positive power and a second lens unit having a negative power and serving as a variator lens unit and each of the first and second lens units comprises at least one negative lens and at least one positive lens, then the variation of chromatic aberration at the time of varying the magnification becomes small, which is preferable for obtaining a zoom lens having a high zooming ratio.

In the following preferred embodiments, some aspherical surfaces are used in which their positive refractive power gradually decreases in the direction from the center to the periphery of the surfaces, thereby properly correcting especially spherical aberration, coma, or the like.

DETAILED DESCRIPTION OF THE PREFERRED EMBODIMENTS

Figure 1A:
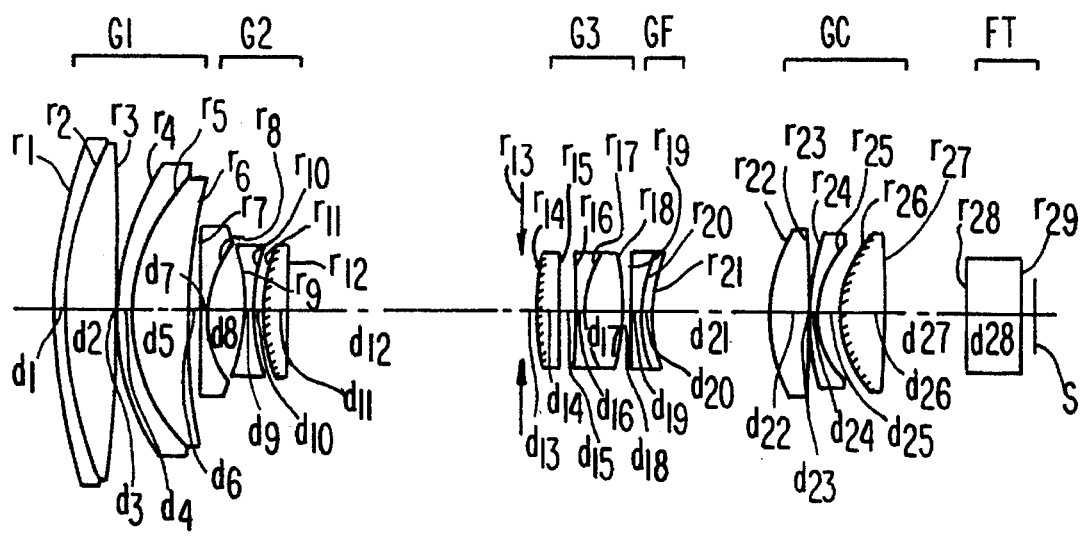
FIG. 1A is a cross-sectional view of a zoom lens according to a first embodiment of the present invention at the wide-angle end.

Referring to the drawings, first and second embodiments of the present invention are described. Additionally, numerical data are shown after the description of the embodiments.

Figure 1B:
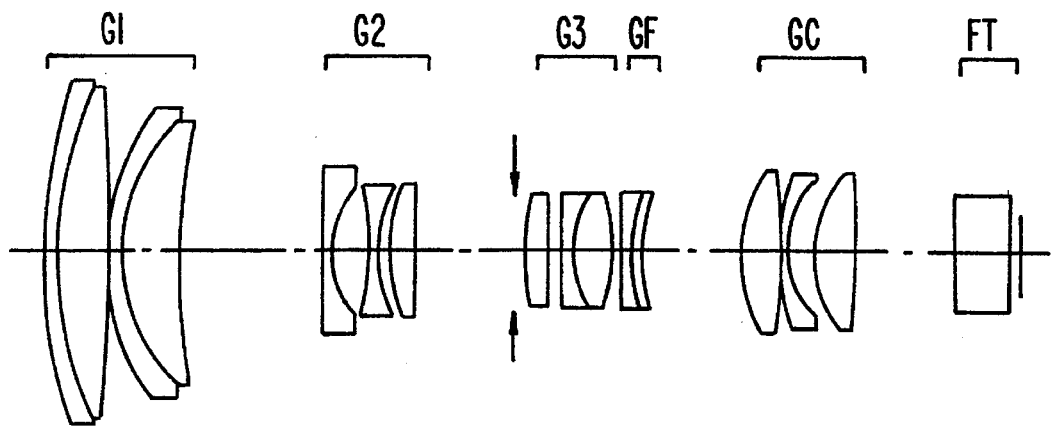
FIG. 1B is a cross-sectional view of a zoom lens according to the first embodiment of the present invention at the standard state.
Figure 1C:
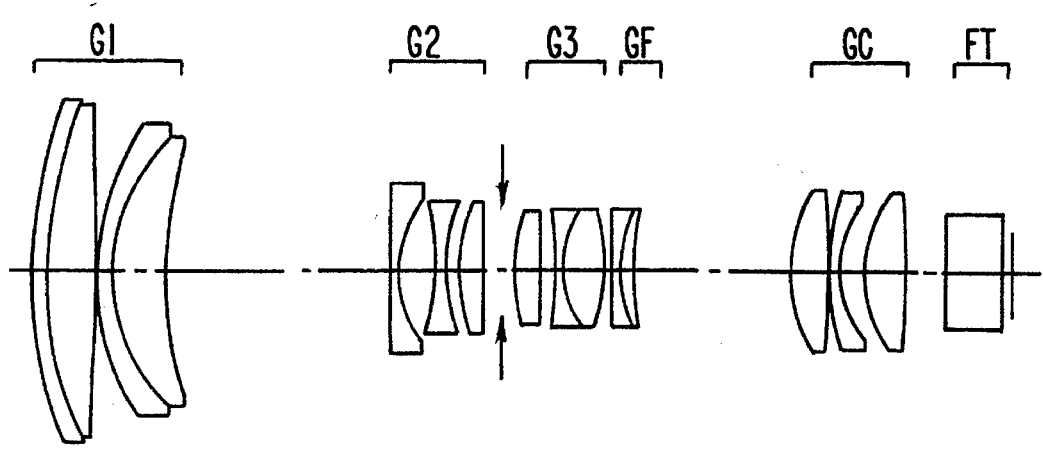
FIG. 1C is a cross-sectional view of a zoom lens according to the first embodiment of the present invention at the telephoto end.

FIGS. 1(A), 1(B) and 1(C) are cross-sectional views of a zoom lens according to a first embodiment of the present invention at the wide-angle end, in the standard state, and at the telephoto end, respectively.

A front lens group arranged in front of an aperture stop for varying magnification comprises, in the order from the object side, a first lens unit G1 including a cemented lens formed by a negative meniscus lens with its convex surface facing the object side and a biconvex lens, and a cemented lens formed by a negative meniscus lens and a positive meniscus lens with their convex surfaces facing the object side; and a second lens unit G2 including a negative meniscus lens with its convex surface facing the object side, a biconcave lens, and a biconvex lens. A rear lens group arranged behind the aperture stop comprises a third lens unit G3 of a positive refractive power including a biconvex lens, a biconcave lens, and a biconvex lens; a focusing lens unit GF including a cemented lens formed by a biconcave lens and a positive meniscus lens with its convex surface facing the object side; and a compensator lens unit GC of a positive refractive power including a biconvex lens, a negative meniscus lens with its convex surface facing the object side, and a biconvex lens. A filter FT is arranged between the compensator lens unit GC and an image plane S. Aspherical surfaces are used for three surfaces: the object-side surface of the biconvex lens of the second lens unit G2, the most object-side surface of the third lens unit G3, and the object-side surface of the image-side biconvex lens of the compensator lens unit GC.

Figure 2A:
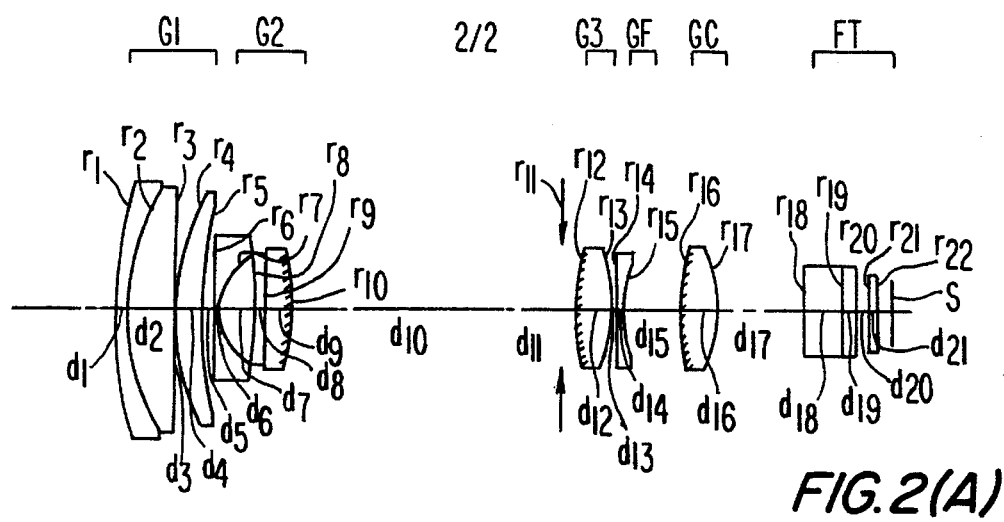
FIG. 2A is a cross-sectional view of a zoom lens according to a second embodiment of the present invention at the wide-angle end.
Figure 2B:
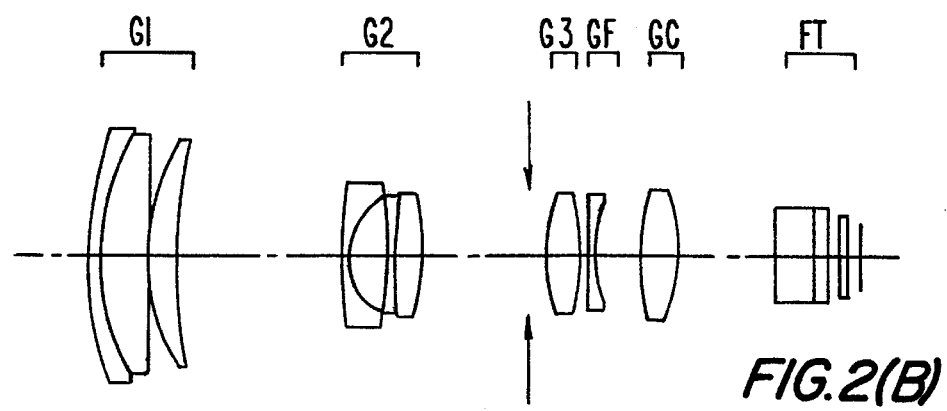
FIG. 2B is a cross-sectional view of a zoom lens according to the second embodiment of the present invention at the standard state.
Figure 2C:
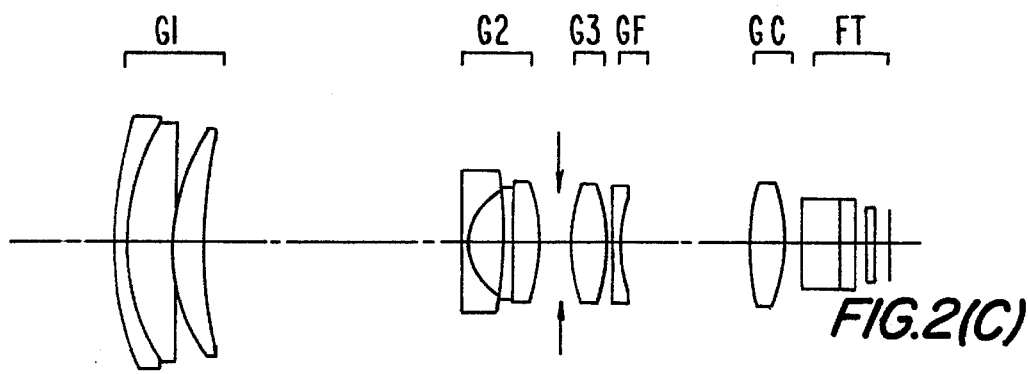
FIG. 2C is a cross-sectional view of a zoom lens according to the second embodiment of the present invention at the telephoto end.

FIGS. 2(A), 2(B) and 2(C) are cross-sectional views of a zoom lens according to a second embodiment of the present invention at the wide-angle end, in the standard state, and at the telephoto end, respectively.

A front lens group arranged in front of an aperture stop for varying magnification comprises, in the order from the object side, a first lens unit G1 including a cemented lens formed by a negative meniscus lens and a positive meniscus lens with their convex surfaces facing the object side and a positive meniscus lens with its convex surface facing the object side; and a second lens unit G2 including a negative meniscus lens with its convex surface facing the object side, and a cemented lens formed by a biconcave lens and a biconvex lens. A rear lens group arranged behind the aperture stop comprises a third lens unit G3 including a biconvex lens; a focusing lens unit GF including a biconcave lens; and a compensator lens unit GC including a biconvex lens. A filter FT is arranged between the compensator lens unit GC and an image plane S. Aspherical surfaces are used for three surfaces: the most image-side surface of the second lens unit G2, the object-side surface of the third lens unit G3, and the object-side surface of the compensator lens unit GC.

In each embodiment, at the time of zooming from the wide-angle end to the telephoto end, the first lens unit G1, the third lens unit G3, and the focusing lens unit GF are fixed on the optical axis, the second lens unit G2 as a variator lens unit moves toward the image side, and the compensator lens unit moves first toward the object side and then toward the image side.

Numerical data for each embodiment are shown below. In addition to the above-mentioned symbols, f is the focal length of the total system; $F_{NO}$ is a f-number; $2\omega$ is a field angle; $f_B$ is a back focal distance; $r_1, r_2, \ldots$ are the radii of curvature of respective lens surfaces; $d_1, d_2, \ldots$ are the distances between the respective lens surfaces; $n_{d1}, n_{d2}, \ldots$ are the refractive indices of the respective lenses for the d-line; and $v_{d1}, v_{d2}, \ldots$ are the Abbe numbers of the respective lenses. W, S, and T in the data of the air spaces in the focusing lens unit represent the zooming to the wide-angle end, the standard state, and the telephoto end and the following values in parentheses represent the object distances. The shape of the aspherical surface is expressed by the following equation:

$$x=[(y^2/r)/[1+\{1-(y/r)^2\}^{1/2}]]+A_4 y^4+A_6 y^6+A_8 y^8$$

where x is the direction of travel of light on the optical axis, y is a direction perpendicular to the optical axis, r is the radius of curvature near the optical axis, and $A_4$, $A_6$, and $A_8$ are the aspherical coefficients of the 4th, 6th, and 8th orders.

| Embodiment 1 | | | |
|---|---|---|---|
| $f = 9 \sim 25.5 \sim 72$ | | | |
| $F_{NO} = 2.0 \sim 2.0 \sim 2.3$ | | | |
| $2\omega = 50° \sim 18.7° \sim 6.7°$ | | | |
| $f_B = 1.00 \sim 1.00 \sim 1.00$ | | | |
| $r_1 = 53.4014$ | $d_1 = 1.400$ | $n_{d1} = 1.80518$ | $v_{d1} = 25.43$ |
| $r_2 = 42.3641$ | $d_2 = 5.100$ | $n_{d2} = 1.60300$ | $v_{d2} = 65.48$ |
| $r_3 = -490.5198$ | $d_3 = 0.200$ | | |
| $r_4 = 27.3753$ | $d_4 = 1.400$ | $n_{d3} = 1.71\ 736$ | $v_{d3} = 29.51$ |
| $r_5 = 18.5523$ | $d_5 = 5.690$ | $n_{d4} = 1.60300$ | $v_{d4} = 65.48$ |
| $r_6 = 55.8425$ | $d_6 = $ Variable | | |
| $r_7 = 177.5974$ | $d_7 = 1.000$ | $n_{d5} = 1.77250$ | $v_{d5} = 49.66$ |
| $r_8 = 10.9050$ | $d_8 = 3.890$ | | |
| $r_9 = -20.5585$ | $d_9 = 1.000$ | $n_{d6} = 1.60300$ | $v_{d6} = 65.48$ |
| $r_{10} = 17.2901$ | $d_{10} = 1.370$ | | |
| $r_{11} = 22.9593$ (Aspherical) | $d_{11} = 2.500$ | $n_{d7} = 1.84666$ | $v_{d7} = 23.78$ |

5,589,986

-continued

Embodiment 1

| | | | | |
|---|---|---|---|---|
| $r_{12} = -2032.2015$ | $d_{12}$ = Variable | | | |
| $r_{13} = \infty$ | $d_{13} = 1.500$ | | | |
| (Aperture Stop) | | | | |
| $r_{14} = 27.3212$ | $d_{14} = 2.500$ | $n_{d8} = 1.67790$ | $\upsilon_{d8} = 55.33$ | |
| (Aspherical) | | | | |
| $r_{15} = -203.9975$ | $d_{15} = 1.500$ | | | |
| (Aspherical) | | | | |
| $r_{16} = 83.0221$ | $d_{16} = 1.000$ | $nd_9 = 1.60342$ | $\upsilon_{d9} = 38.01$ | |
| $r_{17} = 10.5002$ | $d_{17} = 4.200$ | $nd_{10} = 1.60300$ | $\upsilon_{d10} = 65.48$ | |
| $r_{18} = -22.2095$ | $d_{18} = 0.800$ | | | |
| $r_{19} = -123.0110$ | $d_{19} = 1.000$ | $n_{d11} = 1.60311$ | $\upsilon_{d11} = 60.70$ | |
| $r_{20} = 15.2765$ | $d_{20} = 1.200$ | $n_{d12} = 1.80518$ | $\upsilon_{d12} = 25.43$ | |
| $r_{21} = 23.5780$ | $d_{21}$ = Variable | | | |
| $r_{22} = 15.5533$ | $d_{22} = 4.000$ | $n_{d13} = 1.60300$ | $\upsilon_{d13} = 65.48$ | |
| $r_{23} = -158.7039$ | $d_{23} = 0.150$ | | | |
| $r_{24} = 29.8394$ | $d_{24} = 0.930$ | $n_{d14} = 1.80518$ | $\upsilon_{d14} = 25.43$ | |
| $r_{25} = 10.8391$ | $d_{25} = 2.320$ | | | |
| $r_{26} = 11.3016$ | $d_{26} = 4.500$ | $n_{d15} = 1.58913$ | $\upsilon_{d15} = 61.18$ | |
| $r_{27} = -185.6526$ | $d_{27}$ = Variable | | | |
| $r_{28} = \infty$ | $d_{28} = 6.000$ | $n_{d16} = 1.51633$ | $\upsilon_{d16} = 64.15$ | |
| $r_{29} = \infty$ | | | | |

Variation of Air Space for Zooming

| f | 9 | 25.5 | 72 |
|---|---|---|---|
| $d_6$ | 0.8000 | 15.0809 | 23.1166 |
| $d_{12}$ | 24.3166 | 10.0356 | 2.0000 |
| $d_{21}$ | 11.9470 | 10.2360 | 16.1580 |
| $d_{27}$ | 8.2950 | 10.0057 | 4.0849 |

Variation of Air Space for Focusing

| | W(1.0 m) | S(1.0 m) | T(1.0 m) |
|---|---|---|---|
| $d_{18}$ | 1.037 | 3.185 | 10.372 |
| $d_{21}$ | 11.710 | 7.851 | 6.586 |

Aspherical Coefficient

The 11th Surface $A_4 = 0.1.5747 \times 10^{-4}$
$A_6 = 0.99334 \times 10^{-7}$
$A_8 = -0.19838 \times 10^{-8}$ The 14th Surface $A_4 = -0.37311 \times 10^{-4}$
$A_6 = -0.15490 \times 10^{-6}$
$A_8 = 0.15564 \times 10^{-8}$ The 26th Surface $A_4 = -0.43618 \times 10^{-4}$
$A_6 = -0.15699 \times 10^{-6}$
$A_8 = -0.40177 \times 10^{-8}$
$1/\beta_{FT} = 0.39$
$D_F/D_C = 1.42$ (∞~1 m)
$d_T/d_W = 1.35$
$|f_F/f_T| = 0.54$
$\beta_{VT} = -5.44$
$\beta_{CT} = 0.279$ Embodiment 2

$f = 6.5 \sim 20.55 \sim 65$
$F_{NO} = 1.8 \sim 1.9 \sim 2.9$
$2\omega = 52° \sim 17.4° \sim 5.5°$
$f_B = 1.41 \sim 1.41 \sim 1.41$

| | | | | |
|---|---|---|---|---|
| $r_1 = 41.6441$ | $d_1 = 1.100$ | $n_{d1} = 1.80518$ | $\upsilon_{d1} = 25.43$ | |
| $r_2 = 23.3305$ | $d_2 = 4.200$ | $n_{d2} = 1.60311$ | $\upsilon_{d2} = 60.70$ | |
| $r_3 = 285.2795$ | $d_3 = 0.150$ | | | |
| $r_4 = 23.0527$ | $d_4 = 2.700$ | $n_{d3} = 1.69680$ | $\upsilon_{d3} = 55.52$ | |
| $r_5 = 53.5371$ | $d_5$ = Variable | | | |
| $r_6 = 91.2740$ | $d_6 = 0.700$ | $n_{d4} = 1.77250$ | $\upsilon_{d4} = 49.66$ | |
| $r_7 = 5.8578$ | $d_7 = 3.470$ | | | |
| $r_8 = -28.3074$ | $d_8 = 0.700$ | $n_{d5} = 1.54771$ | $\upsilon_{d5} = 62.83$ | |
| $r_9 = 123.6749$ | $d_9 = 2.800$ | $n_{d6} = 1.84666$ | $\upsilon_{d6} = 23.78$ | |
| $r_{10} = -26.6866$ | $d_{10}$ = Variable | | | |
| (Aspherical) | | | | |
| $r_{11} = \infty$ | $d_{11} = 1.500$ | | | |
| (ApertureStop) | | | | |
| $r_{12} = 15.3174$ | $d_{12} = 3.400$ | $n_{d7} = 1.67790$ | $\upsilon_{d7} = 55.33$ | |
| (Aspherical) | | | | |
| $r_{13} = -21.0759$ | $d_{13} = 0.800$ | | | |
| $r_{14} = -178.8163$ | $d_{14} = 0.700$ | $n_{d8} = 1.84666$ | $\upsilon_{d8} = 23.78$ | |
| $r_{15} = 16.9823$ | $d_{15}$ = Variable | | | |
| $r_{16} = 23.4535$ | $d_{16} = 3.500$ | $n_{d9} = 1.58913$ | $\upsilon_{d9} = 61.18$ | |

-continued

Embodiment 2

(Aspherical)
$r_{17} = 17.9681$      $d_{17} = $ Variable
$r_{18} = \infty$       $d_{18} = 3.700$    $n_{d10} = 1.59771$   $\nu_{d10} = 62.83$
$r_{19} = \infty$       $d_{19} = 1.600$    $n_{d11} = 1.52420$   $\nu_{d11} = 70.20$
$r_{20} = \infty$       $d_{20} = 1.000$
$r_{21} = \infty$       $d_{21} = 0.750$    $n_{d12} = 1.48749$   $\nu_{d12} = 70.20$
$r_{22} = \infty$ Variation of Air Space for Zooming

| f | 6.5 | 20.55 | 65 |
|---|---|---|---|
| $d_5$ | 0.8000 | 15.6670 | 24.3843 |
| $d_{10}$ | 25.0843 | 10.2173 | 1.5000 |
| $d_{15}$ | 5.4351 | 4.3349 | 12.3328 |
| $d_{17}$ | 8.3977 | 9.4979 | 1.5000 |

Variation of Air Space for Focusing

| | W(0.3 m) | S(0.7 m) | T(1.0 m) |
|---|---|---|---|
| $d_{13}$ | 0.930 | 1.367 | 3.274 |
| $d_{15}$ | 5.305 | 3.768 | 9.859 |

Aspherical Coefficient

The 10th Surface $A_4 = -0.20964 \times 10^{-3}$
$A_6 = 0.12792 \times 10^{-5}$
$A_8 = -0.12548 \times 10^{-6}$ The 12th Surface $A_4 = -0.12908 \times 10^{-3}$
$A_6 = -0.36120 \times 10^{-6}$
$A_8 = 0.20024 \times 10^{-10}$ The 16th Surface $A_4 = -0.64105 \times 10^{-4}$
$A_6 = 0.78659 \times 10^{-6}$
$A_8 = 0.14537 \times 10^{-9}$ $1/\beta_{FT} = 0.39$
$D_F/D_C = 0.31$ ($\infty \sim 1$ m)
$d_T/d_W = 2.27$
$|f_F/f_T| = 0.28$
$\beta_{VT} = -57.14$
$\beta_{CT} = 0.504$

What is claimed is:

1. A zoom lens comprising, in the order from the object side:

a front lens group including a variator lens unit having a negative refractive power;

an aperture stop; and a rear lens group arranged behind the aperture stop;

wherein the rear lens group includes a lens unit having a positive refractive power, a focusing lens unit having a negative refractive power, a compensator lens unit having a positive refractive power for correcting variation of a position of an image due to variation of magnification; and the distance between the lens unit having the positive refractive power and the focusing lens unit is constant during variation of magnification and variable during focusing.

2. The zoom lens of claim 1, wherein the focusing lens unit satisfies the following condition:

$$0 < 1/\beta_{FT} < 1.0$$

where $\beta_{FT}$ is the lateral magnification of the focusing lens unit focused at an infinite object at a telephoto end.

3. The zoom lens of claim 1, wherein the focusing lens unit satisfies the following condition:

$$0 < 1/\beta_{FT} < 0.7$$

where $\beta_{FT}$ is the lateral magnification of the focusing lens unit focused at an infinite object at a telephoto end.

4. The zoom lens of claim 1, wherein the variator lens unit moves on an optical axis for variation of magnification from a wide-angle end to a telephoto end, the lateral magnification of the variator lens unit focused at an infinite object becomes $-1$ in the course of movement, and the zoom lens satisfies the following condition:

$$\beta_{CT} > 0$$

$$\beta_{VT} < -1$$

where $\beta_{CT}$ is the lateral magnification of the compensator lens unit focused at an infinite object at the telephoto end and $\beta_{VT}$ is the lateral magnification of the variator lens unit focused at an infinite object at the telephoto end.

5. The zoom lens of claim 4, wherein the compensator lens unit moves toward the image side near the telephoto end at the time of the variation of magnification from the wide-angle end to the telephoto end.

6. The zoom lens of claim 1 further satisfying the following condition:

$$0.2 < D_F/D_C < 10$$

where $D_F$ is the amount of movement of the focusing lens unit at the telephoto end from the position where an infinite object is focused to the position where an object at a minimum distance is focused, and $D_C$ is the amount of movement of the compensator lens unit on an optical axis in the whole zooming range.

7. The zoom lens of claim 1 further satisfying the following condition:

$$0.25 < D_F/D_C < 3.0$$

where $D_R$ is the amount of movement of the focusing lens unit at a telephoto end from the position where an infinite object is focused to the position where an object at a minimum distance is focused, and $D_C$ is the amount of movement of the compensator lens unit on an optical axis in the whole zooming range.

8. The zoom lens of claim 1, wherein the front group comprises, in the order from the object side, a first lens unit having a positive refractive power, and the variator lens unit as a second lens unit.

9. The zoom lens of claim 6, wherein the front group comprises, in the order from the object side, a first lens unit having a positive refractive power, and the variator lens unit as a second lens unit.

10. The zoom lens of claim 1 further satisfying the following condition:

$$1 < d_T/d_W < 5 \quad (7)$$

where $d_T$ and $d_W$ are the distances between the focusing lens unit and the compensator lens unit focused to an infinite object at a telephoto end and a wide-angle end, respectively.

11. The zoom lens of claim 6 further satisfying the following condition:

$$1 < d_T/d_W < 5 \quad (7)$$

where $d_T$ and $d_W$ are the distances between the focusing lens unit and the compensator lens unit focused to an infinite object at the telephoto end and a wide-angle end, respectively.

12. The zoom lens of claim 1 further satisfying the following condition:

$$1 < d_T/d_W < 2.4 \quad (7)$$

where $d_T$ and $d_W$ are the distances between the focusing lens unit and the compensator lens unit focused to an infinite object at the telephoto end and a wide-angle end, respectively.

13. The zoom lens of claim 1 further satisfying the following condition:

$$0.1 < |f_F/f_T| < 0.8 \quad (8)$$

where $f_F$ is the focal length of the focussing lens unit and $f_T$ is the focal length of the total lens system at the telephoto end.

14. The zoom lens of claim 13, wherein the focusing lens unit comprises a negative lens and a positive lens.

15. The zoom lens of claim 8, wherein the first lens unit comprises a negative lens and a positive lens, and the second lens unit comprises a negative lens and a positive lens.

16. The zoom lens of claim 9, wherein the first lens unit comprises a negative lens and a positive lens, and the secondlens unit comprises a negative lens and a positive lens.

17. The zoom lens of claim 14, wherein the first lens unit comprises a negative lens and a positive lens, and the second lens unit comprises a negative lens and a positive lens.

18. The zoom lens of claim 1 further comprising an aspherical surface whose positive refractive power decreases in the direction away from an optical axis.

19. The zoom lens of claim 1, wherein marginal rays coming from the front group and incident on the aperture stop are divergent, and the foremost lens unit in the rear lens group has a positive refractive power.

20. The zoom lens of claim 19, wherein the focusing lens unit having the negative refractive power and the compensator lens unit are successively arranged behind the lens unit having the positive refractive power in the rear lens group.

21. The zoom lens of claim 20, wherein the rays coming from the focusing lens unit are substantially afocal.

22. The zoom lens of claim 20, wherein the focusing lens unit moves toward the image side when focused at an object at a short distance.

23. The zoom lens of claim 22, wherein at the time of variation of magnification from a wide-angle end to a telephoto end, the compensator lens unit moves first toward the object side, then toward the image side.

24. The zoom lens of claim 19, wherein the respective lens units move in such a manner that the rays incident on the compensator lens unit at a telephoto end are convergent.

* * * * *

UNITED STATES PATENT AND TRADEMARK OFFICE
CERTIFICATE OF CORRECTION

PATENT NO. : 5,589,986
DATED : December 31, 1996
INVENTOR(S) : Hironori SHIBATA

It is certified that error appears in the above-indentified patent and that said Letters Patent is hereby corrected as shown below:

Column 4, line 23, change "$1 < d_T/d_W < 2.4$" to --$1 < d_T/d_W < 2.4$--.

Column 8, line 30, skip a line between "$A_S = -0.19838...$" and "The 14th Surface".

Column 8, line 33, skip a line before "The 26th Surface".

Column 8, line 38, skip a line after "$A_S = -0.40177...$".

Column 9, line 36, skip a line before "The 12th Surface".

Column 9, line 40, skip a line before "The 16th Surface".

Column 10, line 33, change "$\beta_{CT} > 0$" to --$\beta_{CT} > 0$--.

Column 10, line 31, change "$\beta_{VT} < -1$" to --$\beta_{VT} < -1$--.

Signed and Sealed this

Twenty-ninth Day of July, 1997

Attest:

BRUCE LEHMAN

*Attesting Officer*   *Commissioner of Patents and Trademarks*